Figure 1:
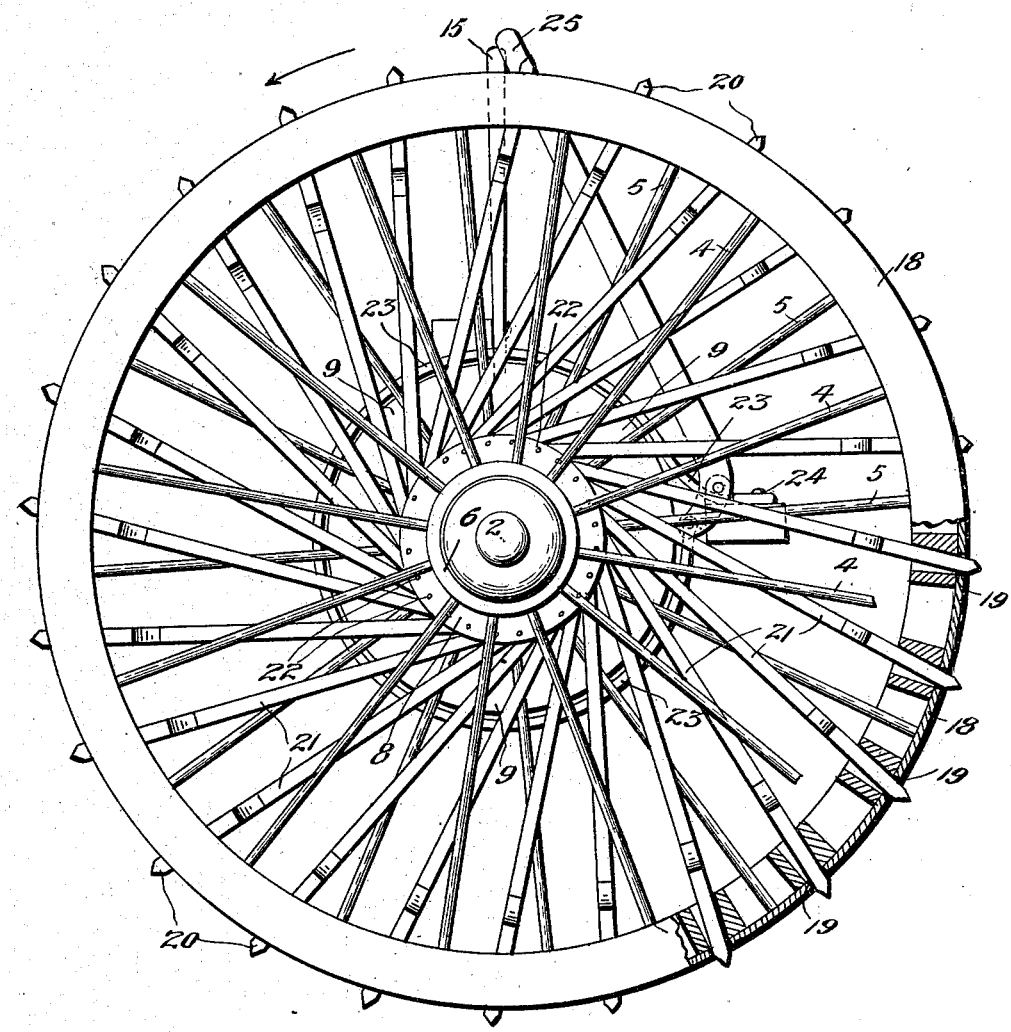

No. 723,132. PATENTED MAR. 17, 1903.
G. P. BREED & E. L. HAWN.
TRACTION WHEEL.
APPLICATION FILED NOV. 20, 1902.
NO MODEL. 2 SHEETS—SHEET 1.

Witnesses Inventors
G. P. Breed and
E. L. Hawn
By H. B. Willson & Co
Attorneys

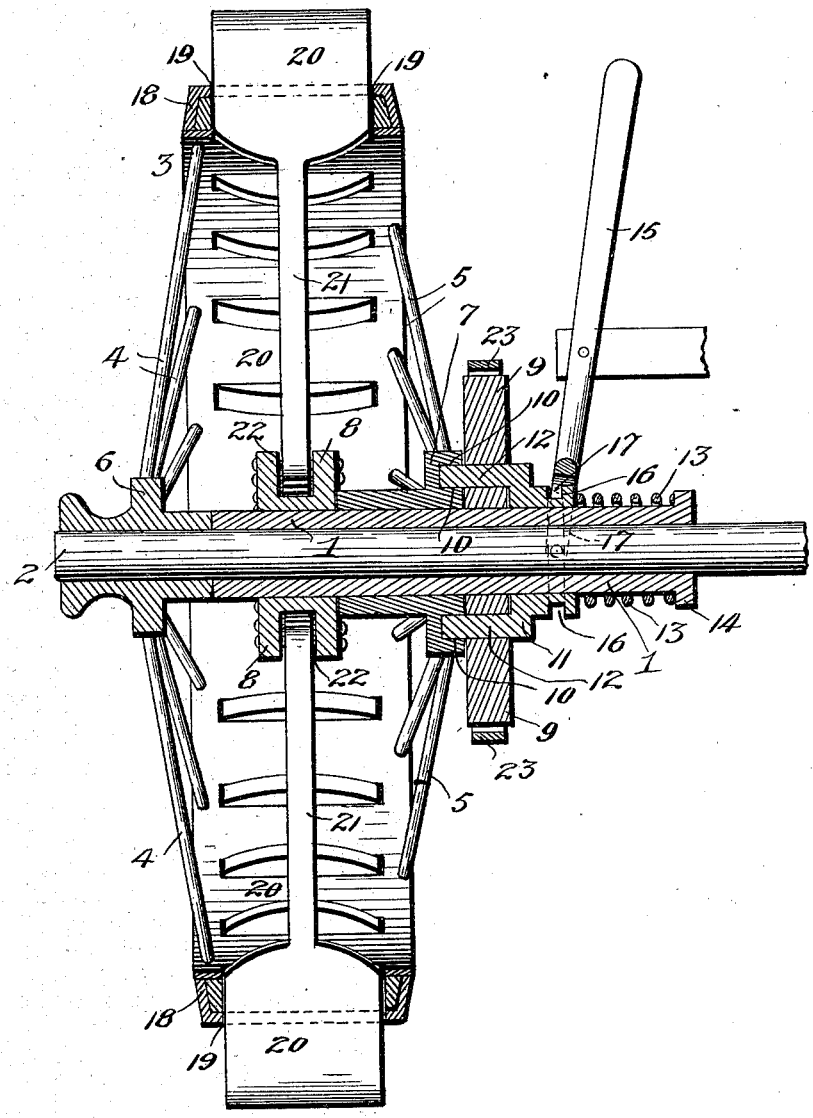

UNITED STATES PATENT OFFICE.

GEORGE P. BREED AND EDD L. HAWN, OF ROCKELM, WISCONSIN.

TRACTION-WHEEL.

SPECIFICATION forming part of Letters Patent No. 723,132, dated March 17, 1903.

Application filed November 20, 1902. Serial No. 132,081. (No model.)

*To all whom it may concern:*

Be it known that we, GEORGE P. BREED and EDD L. HAWN, citizens of the United States, residing at Rockelm, in the county of Pierce and State of Wisconsin, have invented certain new and useful Improvements in Traction-Wheels; and we do declare the following to be a full, clear, and exact description of the invention, such as will enable others skilled in the art to which it appertains to make and use the same.

Our invention is an improved traction-wheel for threshers and other machines; and it consists in the peculiar construction and combination and arrangement of devices, which will be hereinafter described and claimed.

The object of our invention is to provide an improved traction-wheel with radially-movable calk-spurs which are adapted to be projected to any desired extent from its periphery or tread to insure operative engagement with the ground or surface on which the wheel is passing and to provide improved means for operating the said calk-spurs.

In the accompanying drawings, Figure 1 is partly a section and partly an elevation of a traction-wheel embodying our improvements. Fig. 2 is a vertical central transverse sectional view of the same, showing the wheel in position on an axle and provided with our improved means for operating the calk-spurs.

In the embodiment of our invention we provide a sleeve 1, which is placed on the axle 2. The traction-wheel 3 in the form here shown is provided with an outer and an inner series of spokes 4 5. The former are attached to an outer hub 6, which bears directly on the axle, and the spokes 5 are attached to an inner hub 7, which is disposed on the sleeve and is adapted to rotate thereon. The sleeve is revoluble on the axle. A disk 8 is fast on the sleeve and is preferably disposed, as here shown, midway between the inner and outer sides of the traction-wheel. Also secured to the said sleeve is a friction wheel or drum 9, which bears against the inner side of the inner hub 7. The latter is provided with a series of annularly-disposed openings 10, and on the sleeve is a longitudinally-slidable member or clutch 11, which is provided with locking-dogs 12, that operate in openings made transversely in the friction-wheel and are adapted to be moved into and out of engagement with the openings 10 of the inner hub to lock the traction-wheel to the friction-wheel and to release the same therefrom at will. A coil-spring 13 is here shown disposed on the sleeve 1 and bearing between an annular flange 14 thereon and the inner end of the slidable or clutch member 11, the function of this spring being to engage the clutch member with the hub 7 to lock the friction-wheel to the traction-wheel, as will be understood. A lever 15 is provided which is connected to the clutch member 11 and by means of which the clutch member may be disengaged from the hub. The clutch member is provided with an annular groove 16 on its periphery, which groove is engaged by the bifurcated lower end 17 of the lever 15.

The rim 18 of the traction-wheel is provided with peripheral openings 19, which extend transversely thereof, and in the said openings are the radially-movable calk-studs 20. The latter are here shown as disposed tangentially with relation to the disk 8 and as provided with inwardly-extending arms 21, the inner ends of which are pivotally connected to the said disk, as at 22.

A friction-strap or brake-band 23 is disposed around the periphery of the friction wheel or drum 9 and has one of its ends secured at a fixed point, as at 24, to the machine or vehicle on which the traction-wheel is employed. The other end of the friction-strap or brake-band is connected to a lever 25. It will be understood that by means of the said lever the friction-strap or brake-band may be applied to the friction-wheel to retard or arrest the rotation thereof. When the clutch member is in engagement with the hub, so that the friction-wheel is locked to the traction-wheel, the sleeve is caused to rotate in unison with the traction-wheel, and hence the spur-calks are rigidly locked in position. When it is desired to further extend the spur-calks, the clutch member is disengaged from the hub 7 and the rotation of the friction-wheel, and hence of the sleeve and disk, retarded by applying the brake-band or friction-strap to the friction-wheel, as will be understood.

From the foregoing description, taken in connection with the accompanying drawings, the construction, operation, and advantages of our invention will be readily apparent, it is thought, without requiring a more extended explanation.

Various changes in the form, proportion, and the minor details of construction may be resorted to without departing from the principle or sacrificing any of the advantages of this invention.

Having thus fully described our invention, what we claim as new, and desire to protect by Letters Patent, is—

The combination of an axle, a traction-wheel and sleeve independently revoluble on the axle, radially-movable spurs carried by the wheel and connected to the sleeve for operation thereby, a friction-wheel on the sleeve, a friction-band, a lever to apply the latter to the friction-wheel, a clutch slidable on the sleeve and adapted to lock the friction-wheel to the traction-wheel, a spring on the sleeve normally engaging the clutch with the traction-wheel to lock the friction-wheel to the latter, and a lever connected to the clutch and adapted to move the latter into disengaging position, against the tension of the spring, substantially as described.

In testimony whereof we have hereunto set our hands in presence of two subscribing witnesses.

GEORGE P. BREED.
EDD L. HAWN.

Witnesses:
S. COOKE,
H. F. TOUSLEY.